US009287691B2

(12) United States Patent
Fowler, Jr.

(10) Patent No.: US 9,287,691 B2
(45) Date of Patent: Mar. 15, 2016

(54) METHOD AND APPARATUS FOR AN ELECTRICAL BOX BLOCK BRACKET WITH TABS

(71) Applicant: Willie Franklin Fowler, Jr., Roopville, GA (US)

(72) Inventor: Willie Franklin Fowler, Jr., Roopville, GA (US)

(*) Notice: Subject to any disclaimer, the term of this patent is extended or adjusted under 35 U.S.C. 154(b) by 1 day.

(21) Appl. No.: 14/210,853

(22) Filed: Mar. 14, 2014

(65) Prior Publication Data
US 2014/0262480 A1 Sep. 18, 2014

Related U.S. Application Data

(60) Provisional application No. 61/791,915, filed on Mar. 15, 2013.

(51) Int. Cl.
*H02G 3/12* (2006.01)
*H02G 1/00* (2006.01)

(52) U.S. Cl.
CPC . *H02G 3/12* (2013.01); *H02G 1/00* (2013.01); *H02G 3/121* (2013.01); *Y10T 29/49117* (2015.01)

(58) Field of Classification Search
CPC .................................. H02G 3/12; H02G 3/121
USPC .......................................................... 174/58
See application file for complete search history.

(56) References Cited

U.S. PATENT DOCUMENTS

| 7,360,745 | B2* | 4/2008 | Nikayin et al. ............ 248/216.1 |
| 8,079,561 | B2* | 12/2011 | Jafari ....................... 248/231.81 |
| 2007/0170086 | A1 | 7/2007 | Jacks |
| 2008/0078909 | A1 | 4/2008 | Faircloth |
| 2008/0093121 | A1 | 4/2008 | Webb |

FOREIGN PATENT DOCUMENTS

| BE | 1019283 A3 | 5/2012 |
| GB | 2475259 A | 5/2011 |

OTHER PUBLICATIONS

International Search Report and Written Opinion of the International Searching Authority, mailed Jun. 6, 2014.
Application as filed on Mar. 14, 2014, PCT/2014/027612.

* cited by examiner

*Primary Examiner* — Dhirubhai R Patel
(74) *Attorney, Agent, or Firm* — Sutherland Asbill & Brennan LLP

(57) ABSTRACT

An electrical box block bracket can include a face place and rotatable members extending from each of two opposing edges of the face plate. The face plate can also include a aperture providing a passageway through the face plate and sized and shaped to receive a mud ring and/or electrical junction box. Each rotatable member can be rotatable about an axis defined by the intersection between the face plate and the respective rotatable member. Each rotatable member can also include an adjustable tab disposed along the surface of the rotatable member. The adjustable tab can rotate from a first position aligned with the surface of the rotatable member to a second position at an angle to the surface of the rotatable member such that the tab can be folded over at least a portion of an outer wall or rib of a construction block.

18 Claims, 10 Drawing Sheets

METHOD AND APPARATUS FOR AN ELECTRICAL BOX BLOCK BRACKET WITH TABS

CROSS-REFERENCE TO RELATED APPLICATIONS

This application claims priority under 35 U.S.C. §119(c) to U.S. Provisional patent application No. 61/791,915, titled Method and Apparatus for an Electrical Box Block Bracket with Tabs, which was filed on Mar. 15, 2013, the entire contents of which are hereby incorporated herein by reference for all purposes.

TECHNICAL FIELD

Embodiments disclosed herein are generally related to an electrical box mounting bracket and more particularly to a method and apparatus for mounting an electrical box in a cinder block or other similar type wall with an electrical box block bracket with tabs.

BACKGROUND

During the process of installing an electrical box in a block wall, such as a cinder block wall, one contractor, typically an electrical contractor, has to hold an electrical box with mud ring and conduit in place while a second contractor, typically a block mason or brick layer, completes the task of installing the electrical box into the block wall. Because the positioning of the electrical box on the block wall during installation and it's instability, failure of a second contractor to hold the conventional electrical box in place while the block mason completes the installation task can result in the electrical box falling into an opening of the block wall and being lost and/or damaged. This typically means that the electrical contractor has to wait while block mason measures and cuts the opening for the electrical box into the block and then lays the block in place, which can take up to fifteen minutes, or more. Once the opening is cut into the block, and the block is brought back to the install location where the electrical contractor is waiting, the electrical contractor then has to hold the box and conduit in place while block mason places the block or blocks over the electrical box and backfills the area with cement. While the need for two contractors to complete this single task may not seem too burdensome, when considering that large-scale block construction can include hundreds of electrical boxes that need to be installed, the time and money that must be invested to simply hold an electrical box in place can become quite significant.

Another issue is that some items designed or configured to be mounted to an electrical box can require the use of the corner screw holes on the block bracket. Conventional block brackets do not include mounting holes used to mount an electrical box or other device to the block bracket. If an installer or contractor wants to install electrical box or other device a mud ring must be used in conjunction with the electrical box to hold it in place on the block bracket. Conventional block brackets are not capable of coupling to both an electrical box and another device, such as an alarm strobe because the conventional block bracket lacks mounting holes.

BRIEF DESCRIPTION OF THE DRAWINGS

Reference will now be made to the accompanying drawings, which are not necessarily drawn to scale, and wherein.

DETAILED DESCRIPTION OF THE EXEMPLARY EMBODIMENTS

Figure 1A:
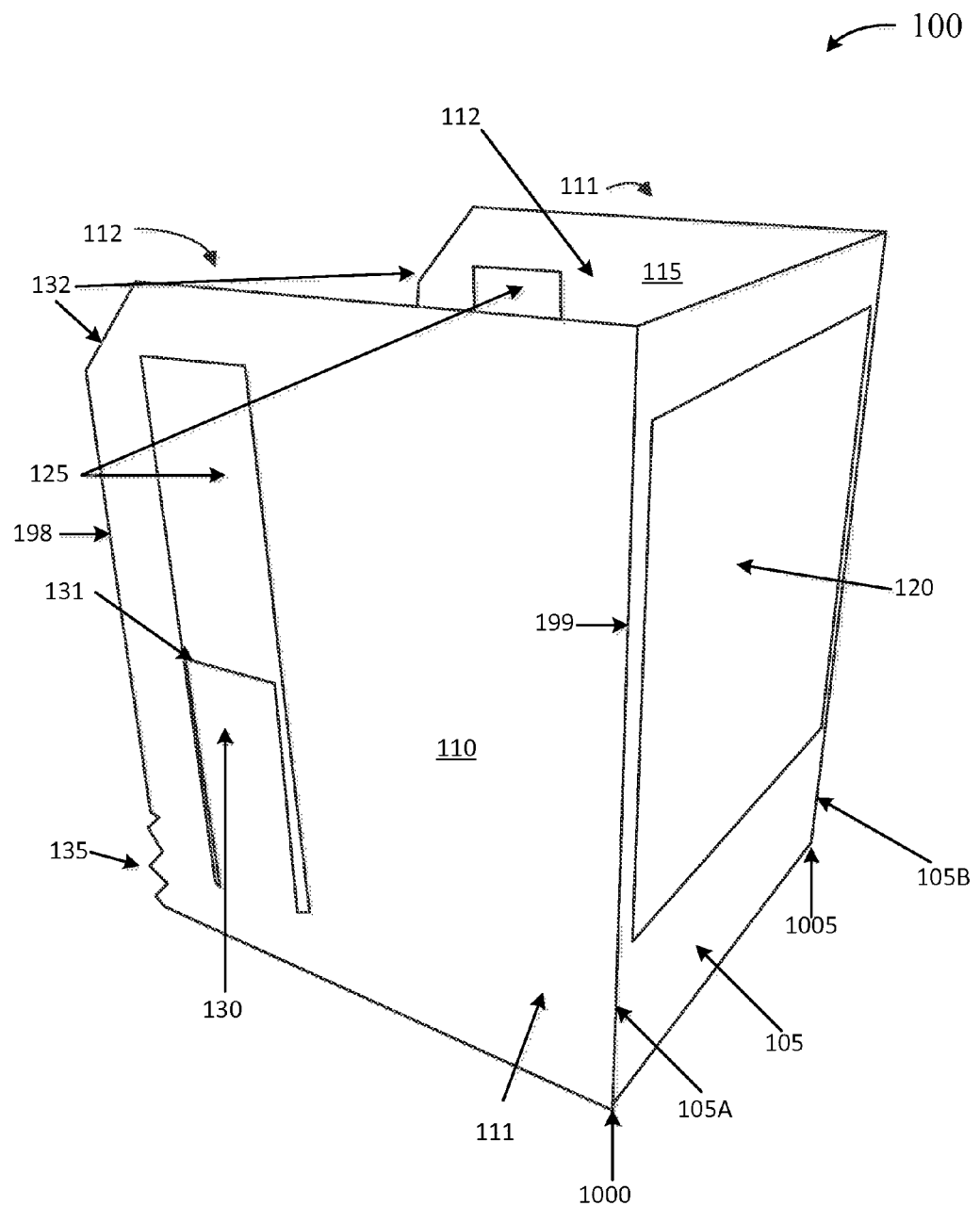
FIGS. 1A-D illustrate various views of an electrical box block bracket in accordance with one exemplary embodiment of the disclosure.
Figure 1B:
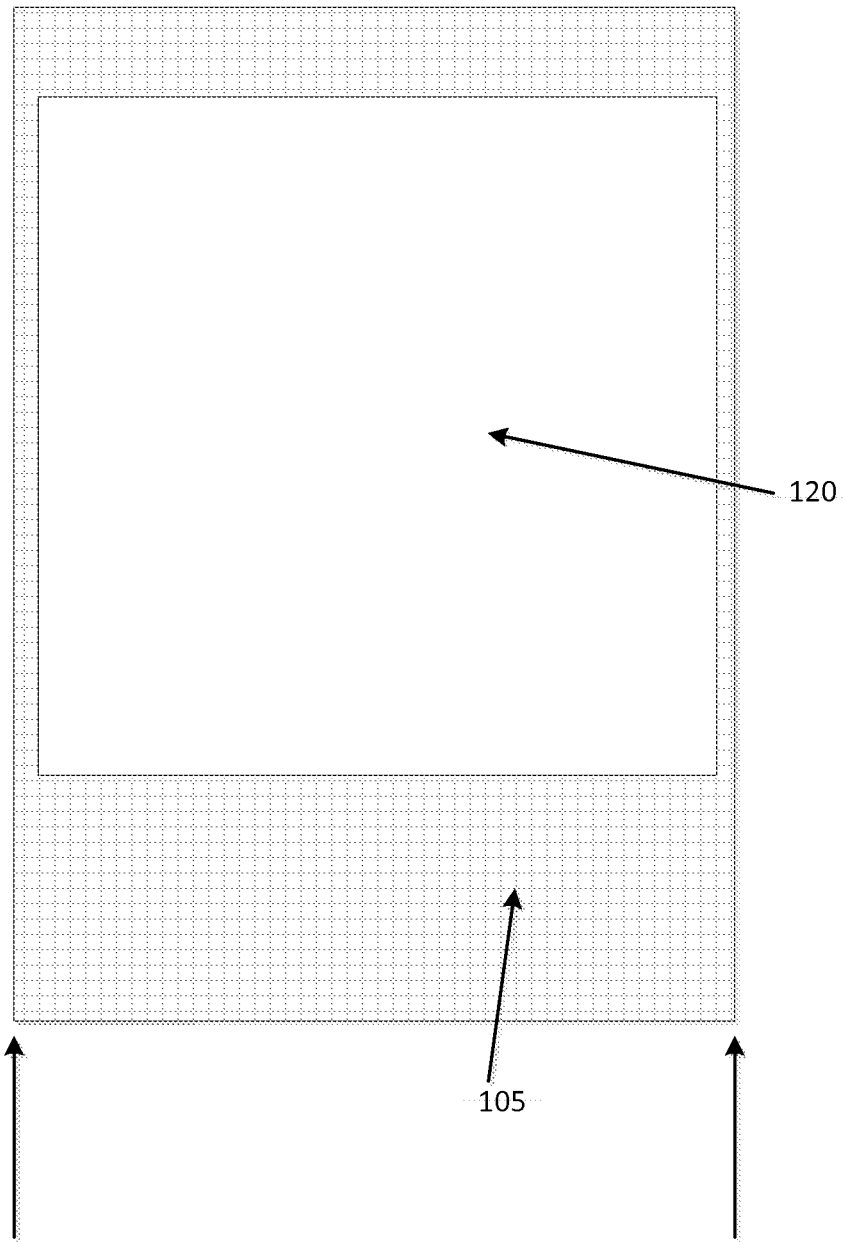
Figure 1C:
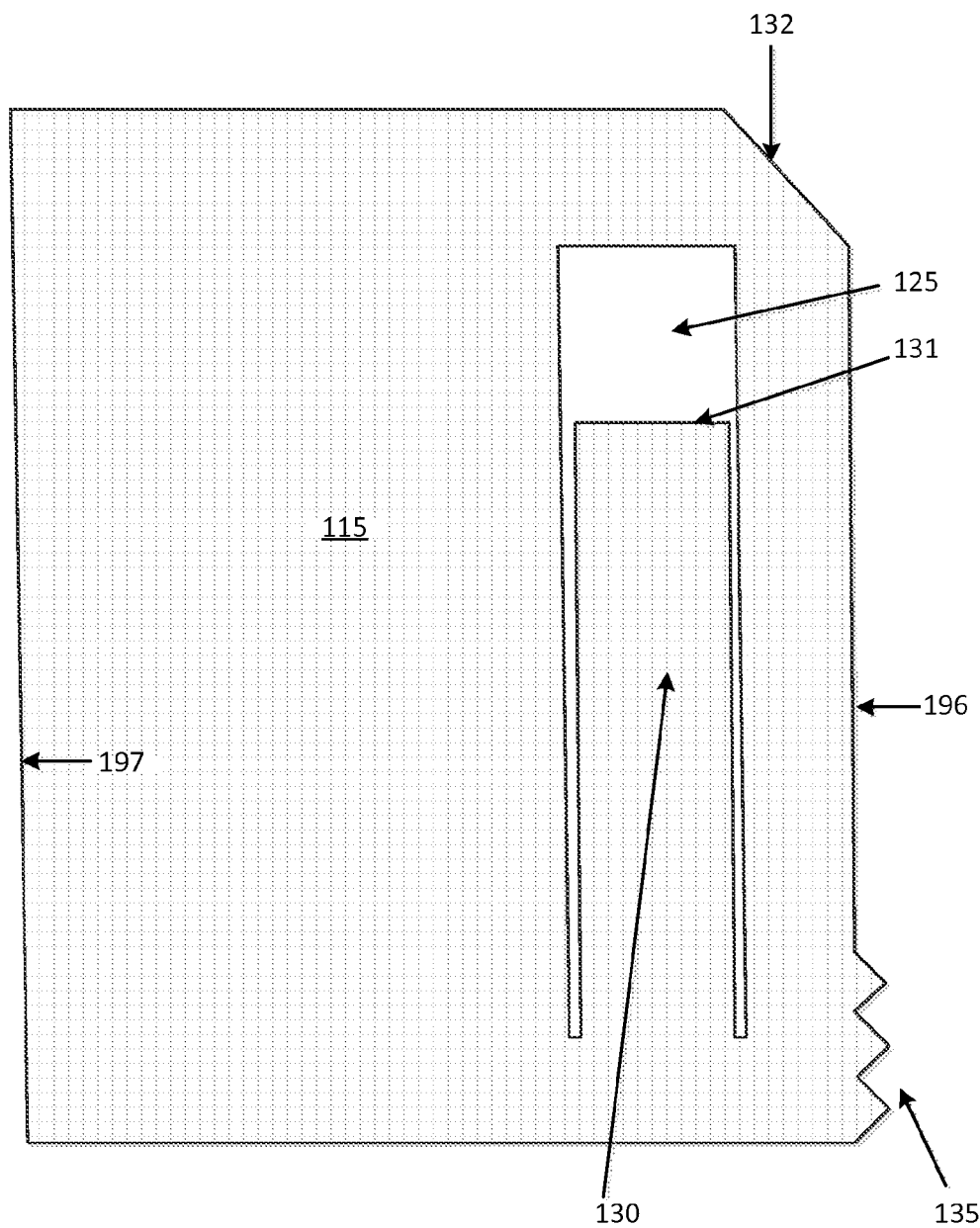
Figure 1D:
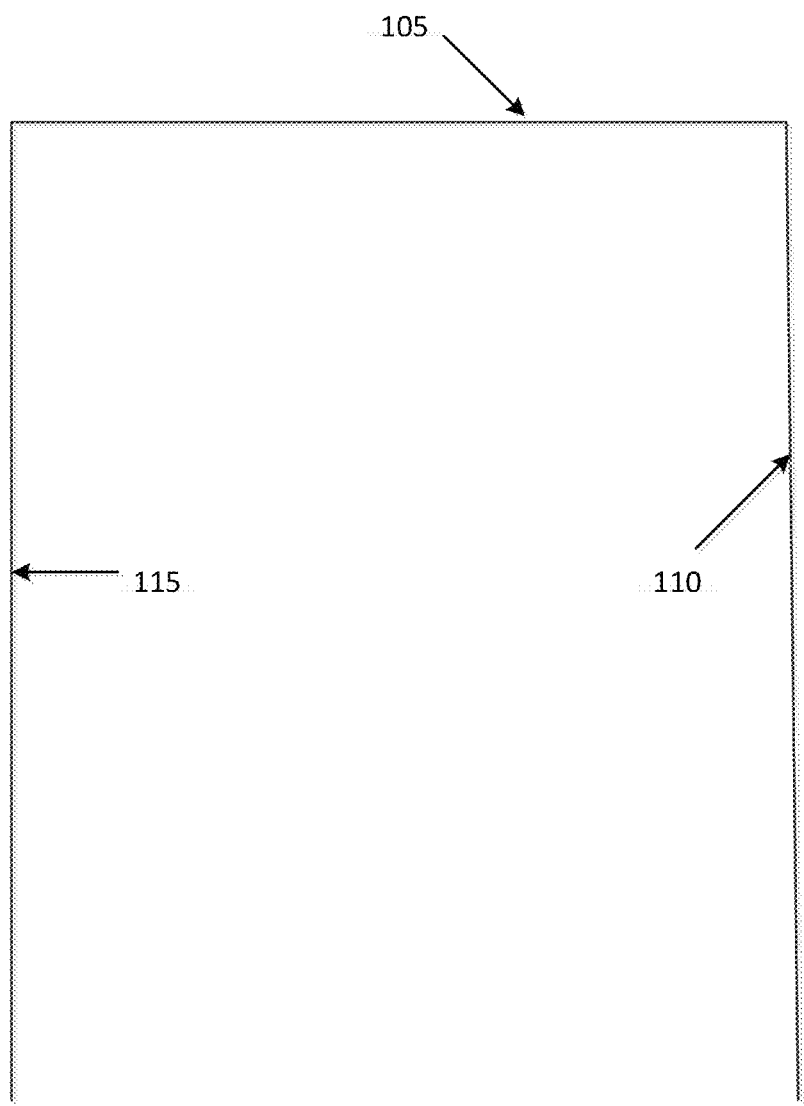

Exemplary embodiments will now be described more fully hereinafter with reference to the accompanying drawings, in which exemplary embodiments are shown. The concepts disclosed herein may, however, be embodied in many different forms and should not be construed as limited to the exemplary embodiments set forth herein; rather, these embodiments are provided so that this disclosure will be thorough and complete, and will fully convey the scope of the concepts to those skilled in the art. Like numbers refer to like, but not necessarily the same or identical, elements throughout. Turning now to the drawings, in which like numerals indicate like elements throughout the figures, exemplary embodiments are described in detail. As would be recognized by a person of ordinary skill in the art having the benefit of the present disclosure, the claimed invention may be embodied in many different forms and should not be construed as limited to the exemplary embodiments depicted and described herein.

The present disclosure is directed to methods and apparatus for an electrical box block bracket. The exemplary electrical box block bracket can sit down in an open cell of a concrete block or other type of block building material to hold the electrical box in place for a brick mason to come along later and cut the covering block. This eliminates the need of the electrical contractor having to babysit the electrical box until the brick mason arrives or completes the measuring and cutting of the block for installation.

The electrical box block bracket can include a front face that includes an opening therethrough to receive an electrical junction box, such as a four-inch square electrical junction box or any other type of electrical junction box. The electrical box block bracket can have opposing top and bottom edges and opposing side edges. A first flexible panel can be coupled to and extend from one of the side edges of the face plate. In one example the first adjustable panel can rotate about the longitudinal axis of the side edge. A second adjustable panel can be coupled to and extend from the opposing side edge of the face plate. Similar to the first adjustable panel, the second adjustable panel can rotate about the longitudinal axis of the opposing side edge. In one example embodiment, the axis of rotation for the first adjustable panel and the second adjustable panel are parallel to one another. Each of the first and second adjustable panels can be integrally formed with the face plate and can include a foldable tab disposed along the surface of the respective adjustable panel. The foldable tab is configured to extend out from the surface of the respective adjustable panel and contact a surface of a mounting block to provide additional stability to the rear portion of the electrical box coupled to the electrical box block bracket. The rear edge of each adjustable panel may also include a serrated edge extending along at least a portion of the rear edge. The serrated edge can be configured to contact an inner wall of an opening of a block, such as a cinder block, to create increased friction between the rear edge of the adjustable panel and the inner wall of the block to help hold the electrical box block bracket in place before the foldable tabs are folded over portions of the block.

Hereinafter, the electrical box block bracket will be described with reference to installation in/on a cinder block. However, the description of the electrical box block bracket being installed in a cinder block wall is for example purposes only as the electrical box block bracket can be used with many other types of block used to form block walls or other structures. As such, the description of the apparatus and methods with reference to a cinder block formation should not be so limited.

FIGS. 1A-D present various views of an electrical box block bracket 100 according to one exemplary embodiment of the disclosure. Referring now to FIGS. 1A-D, the example electrical box block bracket 100 can include a face plate 105. The face plate 105 can be a planar or substantially planar member having a front side, an opposing rear side, a top edge, a bottom edge, and opposing first 105A and second 105B side edges. In certain embodiments, the face plate 105 can have a generally rectangular shape. Alternatively, the face plate 105 can have other geometric and non-geometric shapes. The face plate 105 can be constructed of metal (such as sheet metal, steel, aluminum, etc.), plastic, or any other material known in the art.

The face plate 105 can also include an electrical box aperture 120 that provides a passageway through the face plate 105 from the front side to the rear side. In certain example embodiments, the electrical box aperture 120 is sized and shaped to receive, at least partially therein, a mud ring and/or four inch by four inch square electrical junction box (e.g., a portion of the face plate is pinched or sandwiched between the mud ring and the electrical junction box to hold the electrical junction box to the electrical box block bracket). In one example embodiment, the electrical box aperture 120 is square or substantially square-shaped. Alternatively, the electrical box aperture 120 can have any other geometric or non-geometric shape including, but not limited to, round and rectangular. In certain example embodiments, the electrical box aperture 120 takes up at least half of the surface area of the face plate 105. Alternatively, the electrical box aperture 120 takes up anywhere between 20%-95% of the surface area of the face plate 105.

The electrical box block bracket can also include a first adjustable panel 110 and a second adjustable panel 115. In certain example embodiments, the first adjustable panel 110 is a planar or substantially planar member having an outer surface 111 and an opposing inner surface 112. The first adjustable panel 110 can be coupled to or integrally formed with the face plate 105 along the first side edge 105A of the face plate 105 and the first side edge 199 of the first adjustable panel 110. For example, the first adjustable panel 110 may be coupled to one portion of a hinge and the second portion of the hinge may be coupled to the face plate 105. Alternatively, the material used to make the first adjustable panel 110 and the face plate 105 may be such that it is flexible and/or elastic or otherwise configured to cyclically move between multiple angles with respect to the rear surface of the face plate 105.

The first adjustable panel 110 can extend away from the back side of the face plate 105 in an orthogonal or substantially orthogonal direction from the planar surface of the face plate 105 to a second side edge 198 of the first adjustable panel 110. In one example embodiment, the first adjustable panel 110 is made from the same material as the face plate 105 (e.g., sheet metal, steel, aluminum, another metal or metal alloy, or plastic). In certain example embodiments, the first adjustable panel 110 rotates about a first vertical axis 1000. The first vertical axis 1000 can be defined by the connection segment (e.g., the first side edge 105A of the face plate 105 and the first side edge 199 of the first adjustable panel 110) between the first adjustable panel 110 and the face plate 105. In one example, the first adjustable panel 110 is capable of rotating in such a way as to generate an angle between the rear surface of the face plate 105 and the inner surface 112 of the first adjustable panel 110 of between 1-180 degrees.

The first adjustable panel 110 can also include or have coupled thereto an adjustable tab 130. The adjustable tab 130 can have a fixed end affixed to the first adjustable panel 110 and a free end 131 distally positioned from the fixed end. In one example embodiment, the adjustable tab 130 is integrally formed with the first adjustable panel 110. Alternatively, the fixed end of the adjustable tab 130 can be coupled to a portion of the first adjustable panel 110 (such as by screws, rivets, welding, adhesive, etc.). The adjustable tab 130 can have any geometric or non-geometric shape including, but not limited to, a rectangle. In certain example embodiments, the adjustable tab 130 is an elongated member having a length that is greater than or substantially greater than its width and is configured to bend along the fixed end at or near the line where the adjustable tab 130 intersects the remainder of the first adjustable panel 110 to extend out away from the outer surface 111 of the first adjustable panel 110. In one example embodiment, at least a portion of the adjustable tab 130, including the free end 131, may be adjusted from a first position, where the outer surface of the adjustable tab 130 is aligned or substantially aligned (parallel plane) with the outer surface 111 of the first adjustable panel 110, to a second position, where at least a portion of the adjustable tab 130 extends in a direction orthogonal to or substantially orthogonal to the outer surface 111 of the first adjustable panel 110. In certain example embodiments, at least a portion of the adjustable tab 130 may be further bent so as to extend downward from the orthogonally extending portion in an orthogonal or substantially orthogonal direction such that this further extending portion is extending in a direction that is substantially parallel to the outer surface 111 of the first adjustable panel 110.

The first adjustable panel 110 can also include a tab aperture 125. The tab aperture 125 provides an opening or passageway through the first adjustable panel 110 and also provides a way to access or otherwise grip the free end 131 of the adjustable tab 130. The example tab aperture may have any geometric or non-geometric shape. In one example embodiment, the width of the tab aperture 125 is the same or slightly greater than the width of the adjustable tab 130 and the length of the tab aperture 125 can be anywhere between slightly greater than the length of the adjustable tab 130 to significantly greater (e.g., on the order of twice as long) as the length of the adjustable tab 130.

The first adjustable panel 110 may also include one or more serrations 135 that together form a serrated edge 135. The serrations can be disposed along a free edge of the first adjustable panel 110 and can extend from the bottom of the free edge upward along all or a portion of the free edge. In one example embodiment, the serrated edge 135 may extend along only a portion of the free edge of the first adjustable panel 110 and is configured to engage or otherwise contact an inner surface of a cinder block to increase the friction between the first adjustable panel 110 and the inner surface of the cinder block and to limit rotational movement of the bracket 100 into the opening of the cinder block. The first adjustable panel 110 may also include a beveled edge 132 extending from the top edge of the first adjustable panel 110 to the free edge of the first adjustable panel 110. In one example embodiment, the beveled edge 132 is configured to allow another block to fit over the electrical box block bracket 100 without hitting the top edge of the first adjustable panel 110, which would occur if the edge 132 was not beveled. In certain example embodiments, the length of the beveled edge 132 is adjustable and can be increased by decreasing the length of the tab aperture 125.

In certain example embodiments, the second adjustable panel 115 is a planar or substantially planar member having an outer surface 111 and an opposing inner surface 112. The second adjustable panel 115 can be coupled to or integrally formed with the face plate 105 along the second side edge 105B of the face plate 105 and the first side edge 199 of the first adjustable panel 110. For example, the second adjustable panel 115 may be coupled to one portion of a hinge and the second portion of the hinge may be coupled to the second side edge of the face plate 105. Alternatively, the material used to make the second adjustable panel 115 and the face plate 105 may be such that it is flexible and/or elastic or otherwise configured to cyclically move between multiple angles with respect to the rear surface of the face plate 105.

The second adjustable panel 115 can extend away from the back side of the face plate 105 in an orthogonal or substantially orthogonal direction from the planar surface of the face plate 105 to a second side edge 196 of the second adjustable panel 115. In one example embodiment, the second adjustable panel 115 is made from the same material as the face plate 105 (e.g., sheet metal, steel, aluminum, another metal or metal alloy, or plastic). In one example embodiment, the face plate 105, first adjustable panel 110, second adjustable panel 115 and tabs 130 are integrally formed from a single piece of material (e.g., a single piece of sheet metal, steel, aluminum, another metal, a metal alloy, plastic, etc.). In certain example embodiments, the second adjustable panel 115 rotates about a second vertical axis 1005. The second vertical axis 1005 can be defined by the connection segment (e.g., the second side edge 105B of the face plate 105 and the first side edge 197 of the second adjustable panel 115) between the second adjustable panel 115 and the face plate 105. In one example, the second adjustable panel 115 is capable of rotating in such a way as to generate an angle between the rear surface of the face plate 105 and the inner surface 112 of the second adjustable panel 115 of between 1-180 degrees. In one example embodiment, the first axis of rotation 1000 of the first adjustable panel 110 and the second axis of rotation 1005 of the second adjustable panel 115 are parallel.

The second adjustable panel 115 can also include or have coupled thereto an adjustable tab 130. The adjustable tab 130 can have a fixed end affixed to the second adjustable panel 115 and a free end 131 distally positioned from the fixed end. In one example embodiment, the adjustable tab 130 is integrally formed with the second adjustable panel 115. Alternatively, the fixed end of the adjustable tab 130 can be coupled to a portion of the second adjustable panel 115 (such as by screws, rivets, welding, adhesive, etc.). The adjustable tab 130 can have any geometric or non-geometric shape including, but not limited to, a rectangle. In certain example embodiments, the adjustable tab 130 is an elongated member having a length that is greater than or substantially greater than its width and is configured to bend along the fixed end at or near the line where the adjustable tab 130 intersects the remainder of the second adjustable panel 115 to extend out away from the outer surface 111 of the second adjustable panel 115. In one example embodiment, at least a portion of the adjustable tab 130, including the free end 131, may be adjusted from a first position, where the outer surface of the adjustable tab 130 is aligned or substantially aligned (parallel plane) with the outer surface 111 of the second adjustable panel 115, to a second position, where at least a portion of the adjustable tab 130 extends in a direction orthogonal to or substantially orthogonal to the outer surface 111 of the second adjustable panel 115. In certain example embodiments, at least a portion of the adjustable tab 130 may be further bent so as to extend downward from the orthogonally extending portion in an orthogonal or substantially orthogonal direction such that this further extending portion is extending in a direction that is substantially parallel to the outer surface 111 of the second adjustable panel 115. As such, the adjustable tab 130 can be of a length that the tab 130 only rests along the top surface of the rib, or side wall of a block, or alternatively may be of a longer length, such that a portion of the tab 130 rests on the top surface of the rib or side wall and another portion of the tab 130 is bent at an angle orthogonal or substantially orthogonal to the first portion to extend along a side surface (e.g., the vertical side surface) of a block (e.g., a cinder block 305).

The second adjustable panel 115 can also include a tab aperture 125. The tab aperture 125 provides an opening or passageway through the second adjustable panel 115 and also provides a way to access or otherwise grip the free end 131 of the adjustable tab 130. The example tab aperture 125 may have any geometric or non-geometric shape including, for example, a rectangular shape. In one example embodiment, the width of the tab aperture 125 is the same or slightly greater than the width of the adjustable tab 130 and the length of the tab aperture 125 can be anywhere between slightly greater than the length of the adjustable tab 130 to significantly greater (e.g., on the order of twice as long) as the length of the adjustable tab 130.

The second adjustable panel 115 may also include one or more serrations 135 that together form a serrated edge 135. The serrations can be disposed along a free edge of the second adjustable panel 115 and can extend from the bottom of the free edge upward along all or a portion of the free edge. In one example embodiment, the serrated edge 135 may extend along only a portion of the free edge of the second adjustable panel 115 and is configured to engage or otherwise contact an inner surface of a cinder block to increase the friction between the second adjustable panel 115 and the inner surface of the cinder block and to limit rotational movement of the bracket 100 into the opening of the cinder block. The second adjustable panel 115 may also include a beveled edge 132 extending from the top edge of the second adjustable panel 115 to the free edge of the second adjustable panel 115. In one example embodiment, the beveled edge 132 is configured to allow another block to fit over the electrical box block bracket 100 without hitting the top edge of the second adjustable panel 115, which would occur if the edge 132 was not beveled. In certain example embodiments, the length of the beveled edge 132 is adjustable and can be increased by decreasing the length of the tab aperture 125. In certain example embodiments, the exemplary bracket 100 may not include the serrated edges 135 on either or both of the adjustable panels 110, 115.

Figure 2:
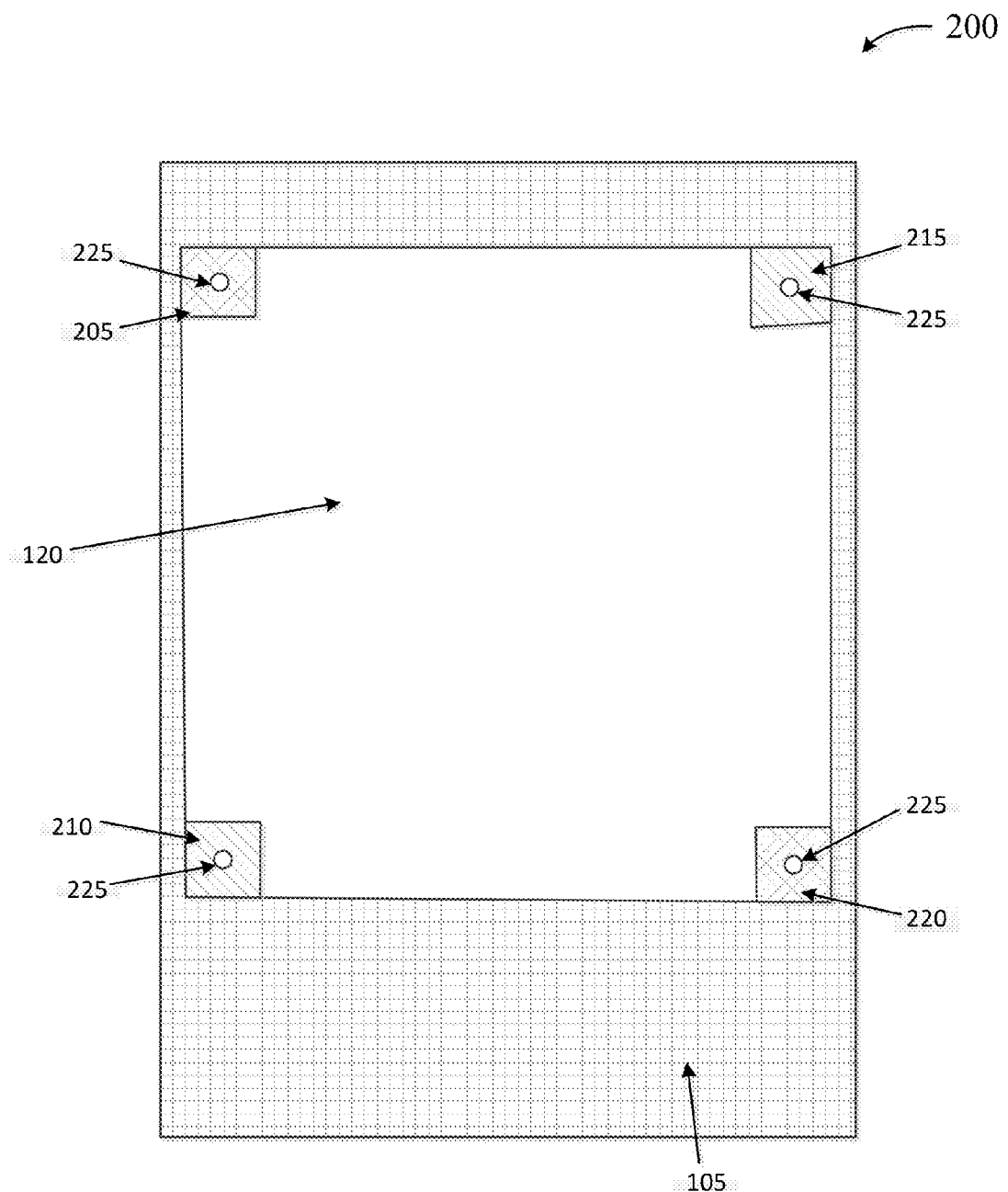
FIG. 2 illustrates a front elevation view of an alternative electrical box block bracket in accordance with another exemplary embodiment of the disclosure.

FIG. 2 presents a front elevation view of an alternative embodiment 200 for the electrical box block bracket according to one exemplary embodiment. Referring now to FIGS. 1A-2, the example electrical box block bracket 200 has generally the same features as described with reference to the electrical box block bracket 100 of FIGS. 1A-D and the description of FIGS. 1A-D is incorporated herein for the electrical box block bracket 200. In addition, the electrical box block bracket 200 can further include one or more screw tabs 205-220. In one example embodiment, each screw tab 205-220 may include a planar or substantially planar surface that extends from the face plate 105 into the electrical box aperture 120. In one example, four screw tabs 205-220 are provided. However, in alternative embodiments, fewer or greater numbers of screw tabs 205-220 may be provided. In one example embodiment, each screw tab 205-220 is integrally formed with the face plate 105. Alternatively, each screw tab 205-220 may be made separately and coupled to the face place 105 (e.g., via screws, welding, adhesive, rivets, etc.).

Each screw tab 205-220 may include a screw aperture 225. The screw aperture 225 may be a through-hole or may be threaded in certain example embodiments. The example screw aperture 225 has a generally circular shape and provides a passageway through the respective screw tab 205-220. In certain example embodiments, the four screw apertures 225 are provided to allow for the optional capability of installing and/or attaching fire alarm strobes and/or other devices to the electrical box block bracket 200. In certain examples, fire alarm strobes are coupled to the block bracket along with a four or more-sided enclosure or box, such that two screw apertures 225 (e.g., two apertures 225 disposed diagonally from one another) are used to receive two screws therethrough to mount the fire alarm strobe to the face plate 105 of the block bracket 200. As such, by including four screw apertures 225 in the electrical box block bracket 200, two of the screw apertures 225 (e.g., two apertures 225 disposed diagonally from one another) can be used to attach a four-sided square/rectangular junction box or enclosure to the electrical box block bracket 200 and the other two screw apertures 225 (e.g., two other apertures disposed diagonally from one-another) can be used to attach the fire alarm strobe to the electrical box block bracket 200.

Figure 3A:
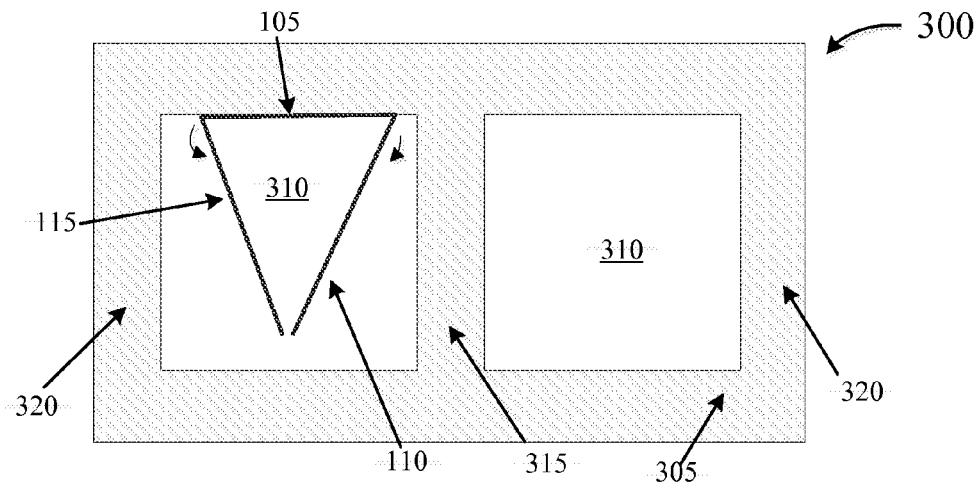
FIGS. 3A-D illustrate a method of installing the example electrical box block brackets in accordance with one exemplary embodiment of the disclosure.
Figure 3B:
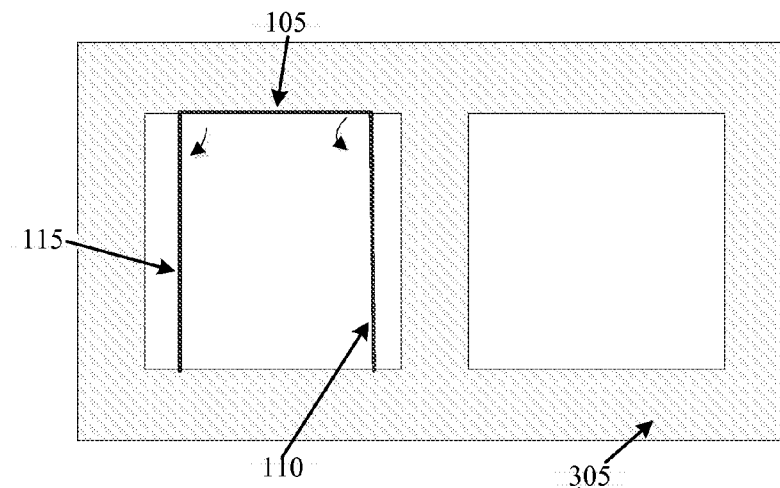
Figure 3C:
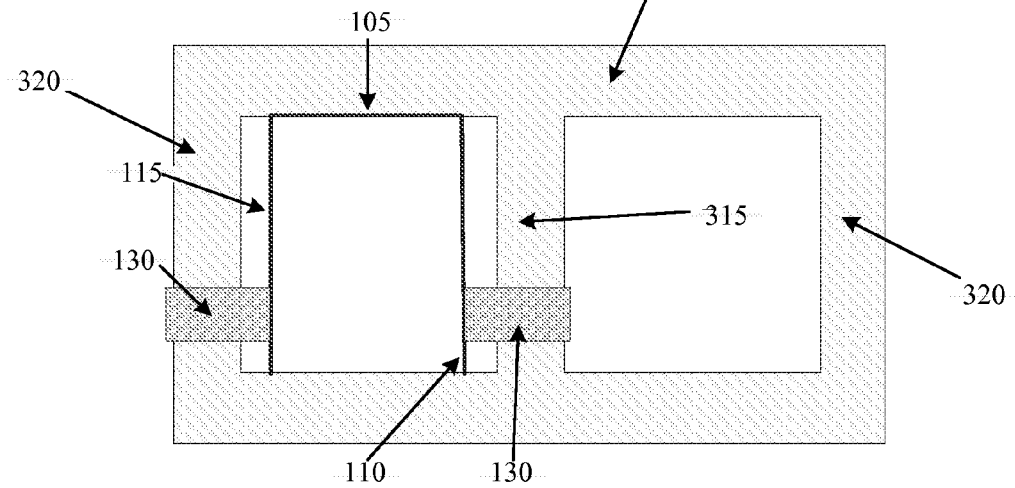
Figure 3D:
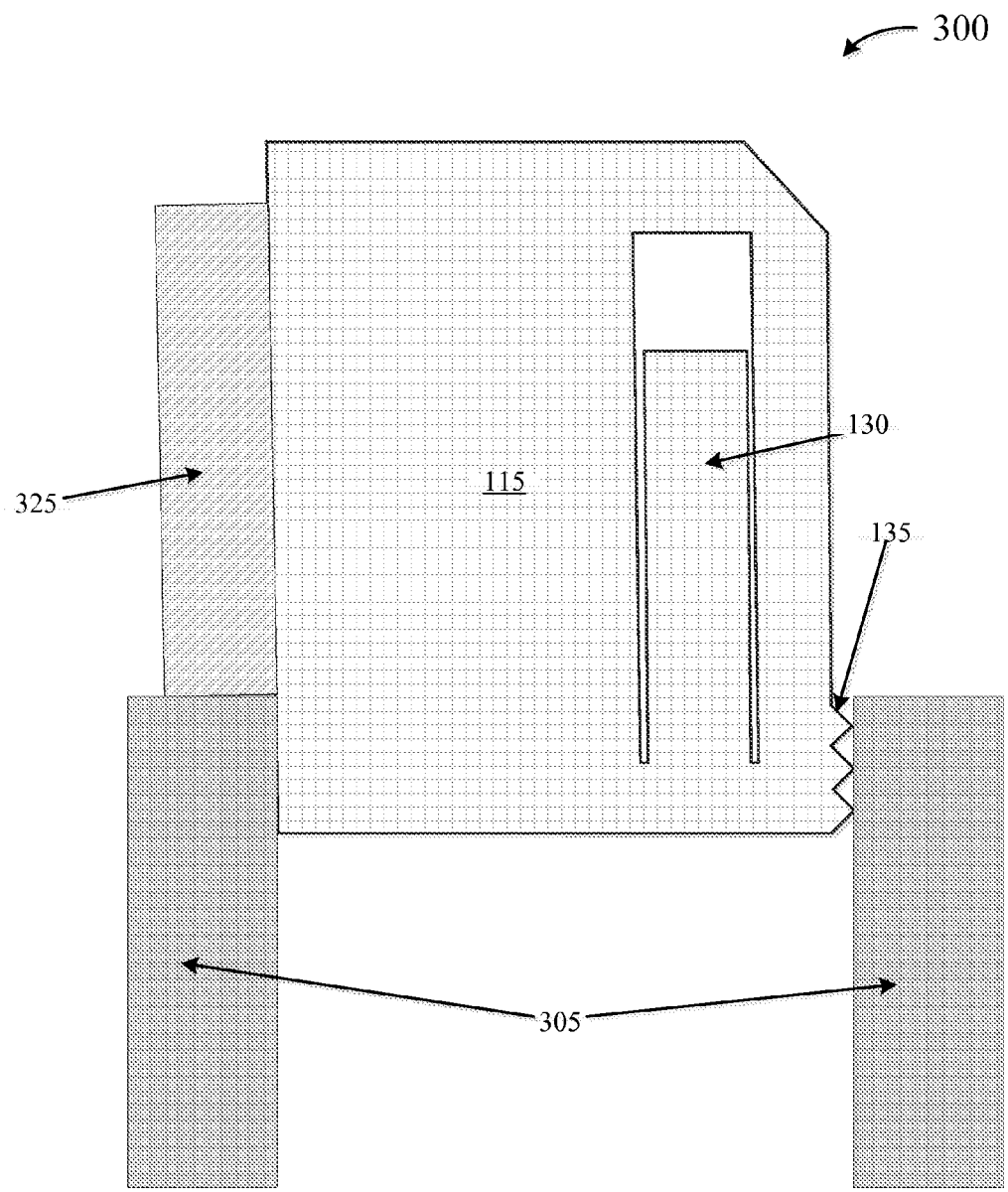

FIGS. 3A-D illustrate a method 300 for installing the example electrical box block bracket 100 of FIGS. 1A-D and/or the bracket 200 of FIG. 2. Now referring to FIGS. 1A-D and 3A-D, the example method 300 can begin as shown in FIG. 3A, where a block, such as cinder block 305 is provided. In one example embodiment, the cinder block 305 may contain one or more open cells 310. The first 110 and second 115 adjustable panels can be folded inward towards one another and towards the rear surface of the face plate 105 of the electrical box block bracket 100. The electrical box block bracket 100 can be inserted into one of the open cells 310 of the cinder block 305 and at least a portion of the mud ring and/or junction box 325 (as shown in FIG. 3D) disposed through the electrical box aperture 120 can have a bottom surface that rests along a wall of the cinder block 305. As shown in FIG. 3A, with the first 110 and second 115 adjustable panels folded inward towards one another. By folding the adjustable panels 110 and 115 inwards, it reduces the distance between the rear surface of the face plate 105 and the free edge of each panel 110, 115 so that the electrical box block bracket 100 can fit within the open cell 310.

As shown in FIG. 3B, the adjustable panels 110, 115 can each be rotated away from the rear surface of the face plate to increase the distance between the rear surface of the face plate 105 and the free edge of the respective panel 110, 115 until the serrated edge 135 makes sufficient contact with the inner surface of the open cell 310 of the cinder block 305 and the electrical box block bracket 100 is initially held in a stable position. FIG. 3D illustrates the electrical box block bracket 100 with the serrated edges 135 of the adjustable panels 110, 115 engaging the side wall of the cinder block 305, at least a portion of the mud ring and/or electrical junction box 325 extending through the electrical box aperture 120 and resting on the top surface of the cinder block 305 prior to at least one of the adjustable tabs 130 being folded over a rib 315 or end wall 320. To further secure the rear end of the electrical box block bracket 100, as shown in FIG. 3C, each adjustable tab 130 in the respective adjustable panels 110, 115 can be folded out and extended past a rib 315 or end wall 320 of the cinder block and folded over the rib 315 or end wall 320, such that at least a portion of each adjustable tab 130 rests on a top surface of the respective rib 315 or end wall 320 to prevent the rear end of the electrical box block bracket 100 from falling into the open cell 310 of the cinder block 305.

Figure 4A:
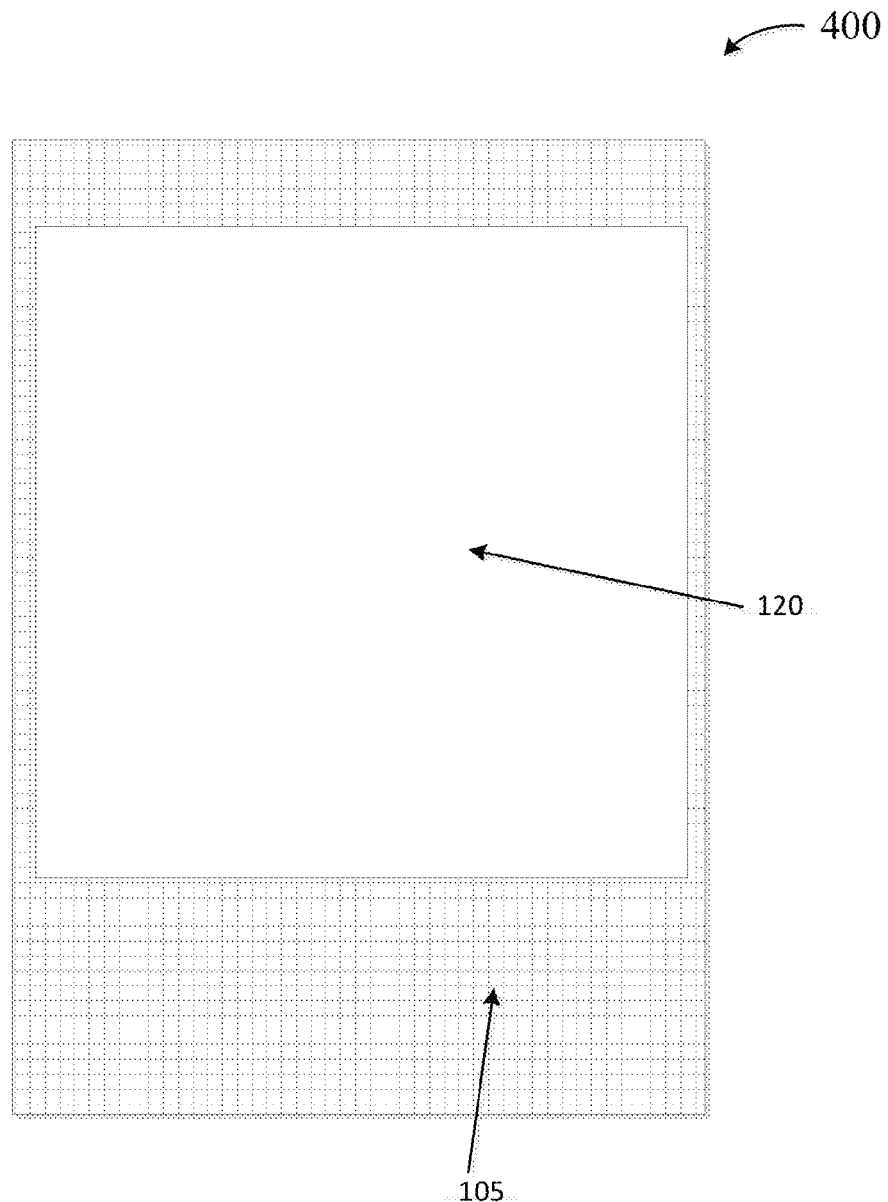
FIGS. 4A-C illustrate various views of another alternative electrical box block bracket in accordance with one exemplary embodiment of the disclosure.
Figure 4B:
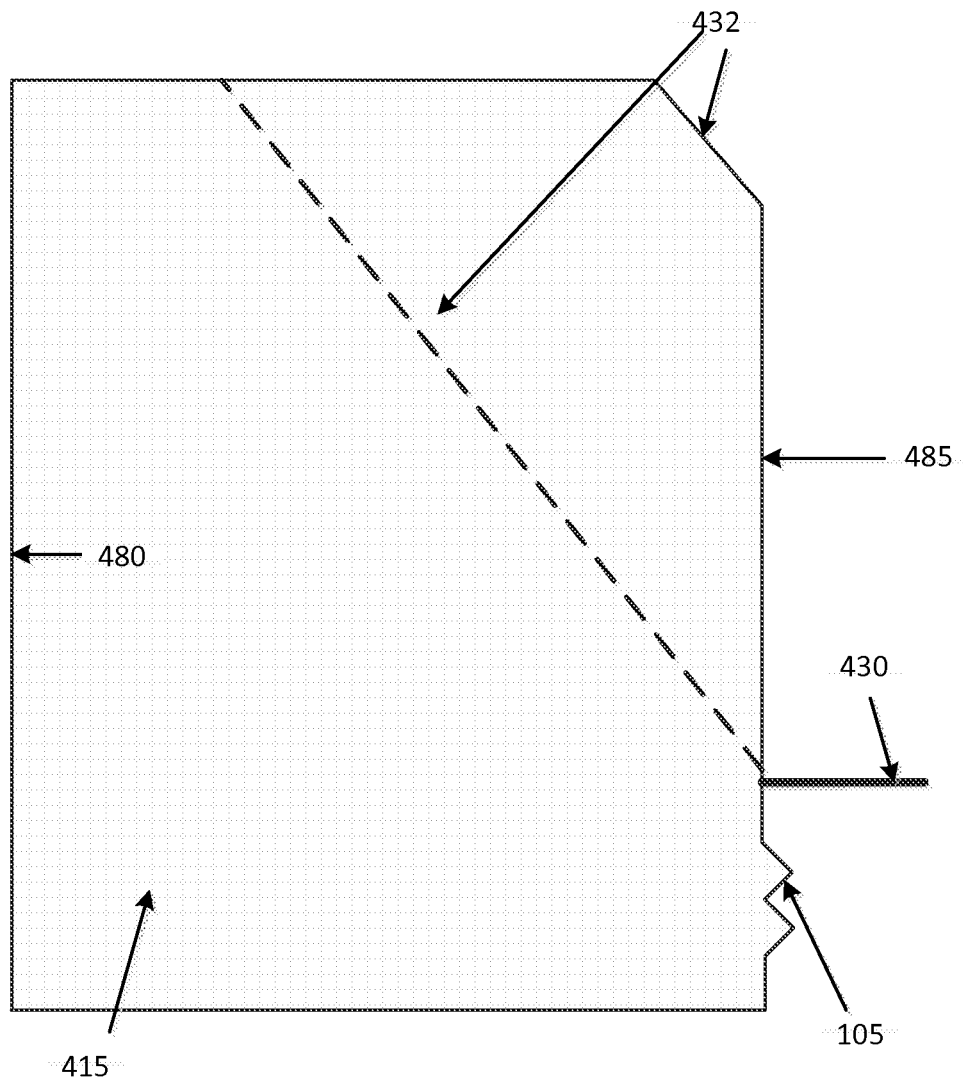
Figure 4C:
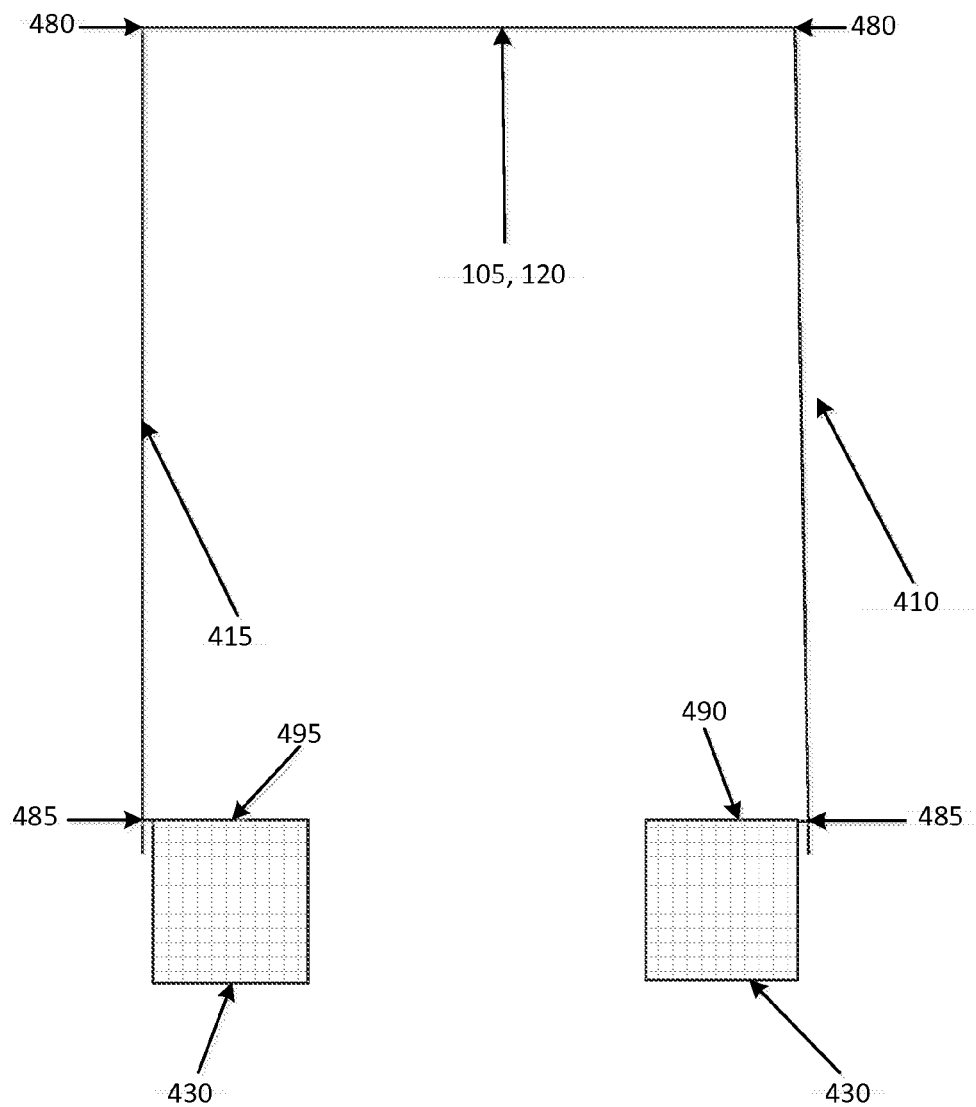

FIGS. 4A-C illustrate various views of another alternative electrical box block bracket 400 according to another exemplary embodiment of the disclosure. Referring now to FIGS. 1A-D and 4A-C, the example electrical box block bracket 400 is generally the same as the bracket 100 of FIGS. 1A-D except as discussed hereinbelow and as such, the description of FIGS. 1A-D is incorporated herein for the electrical box block bracket 400. Unlike the adjustable panels 110, 115 of FIGS. 1A-D, the adjustable panels 410, 415 do not include the adjustable tabs 130 extending from opposing sides of the bracket 100. Instead, the adjustable tabs 430 are coupled to or otherwise integrally formed along a back panel attached to the free second edge 485 of each respective adjustable panel 410, 415. Each adjustable tab 430 is similar to the adjustable tab 130 and can include a rear member 490, 495 and the corresponding tab 430 that can be folded along an intersection line with its respective back panel. Further, instead of folding over a rib 315 or end wall 320 (see FIG. 3) the example adjustable tabs 430 can fold over a top surface of a rear wall that is opposite the wall the mud ring and/or electrical junction box 325 is resting on in the cinder block 305. As such, the folded tab 430 can be of a length that the tab 430 only rests along the top surface of the rear wall, rib, or side wall, or alternatively be of a longer length such that a portion of the tab 430 rests on the top surface of the rear wall, rib, or side wall and another portion of the tab 430 is bent at an angle orthogonal or substantially orthogonal to the first portion to extend along a side surface (e.g., the vertical side surface) of the cinder block 305.

Further, as shown in FIG. 4B, each adjustable panel 410, 415 may also not include the tab aperture (125 of FIG. 1A) and the beveled edge 432 may be similar to the beveled edge 132 of FIG. 1A or may be a much longer beveled edge 432 based at least in part on the removal of the tab aperture 125 from each respective adjustable panel 410, 415. The steps for installing the example bracket 400 would be substantially the same as those described with reference to FIGS. 3A-D except that the respective tabs 430 would be folded over the opposing rear wall of the cinder block 305. Further, the alternative bracket 400 may also include the screw tabs 205-220 and screw apertures along the face plate 105 and in the electrical box aperture 120 as described with reference to FIG. 2.

Accordingly, example embodiments disclosed herein can provide the technical effects of creating an apparatus and method for an electrical box block bracket with tabs. In this regard, installation of electrical boxes is improved in structures that employ block building materials, such as cinder blocks, by holding the electrical box in position within an open cell of the block without the need for manual resistance to keep the electrical box in position.

Although example embodiments of the disclosure have been described, one of ordinary skill in the art will recognize that numerous other modifications and alternative embodiments are within the scope of the disclosure. For example, any materials, shapes and sizes of the example electrical box block brackets and/or the methodology for installing the example electrical box block brackets described herein may be replaced with a different shape, size or type of component or material or the steps of installation may be performed in a similar manner. Furthermore, while various example implementations and architectures have been described in accordance with example embodiments of the disclosure, one of ordinary skill in the art will appreciate that numerous other modifications to the example implementations and architectures described herein are also within the scope of this disclosure.

Although example embodiments have been described in language specific to structural features and/or methodological acts, it is to be understood that the disclosure is not necessarily limited to the specific features or acts described. Rather, the specific features and acts are disclosed as illustrative forms of implementing the example embodiments. Conditional language, such as, among others, "can," "could," "might," or "may," unless specifically stated otherwise, or otherwise understood within the context as used, is generally intended to convey that certain example embodiments could include, while other example embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. An apparatus comprising:
   a first substantially planar member comprising a first edge and an opposing second edge;
   an aperture disposed along the first substantially planar member and providing a passageway through the first substantially planar member;
   a second substantially planar member rotatably coupled to the first substantially planar member and extending from the first edge of the first substantially planar member, wherein the second substantially planar member is rotatable about a first axis;
   a third substantially planar member rotatably coupled to the first substantially planar member and extending from the second edge of the first substantially planar member, wherein the third substantially planar member is configured to rotate about a second axis;
   wherein the second substantially planar member comprises a first edge and an opposing second edge, wherein the first edge is rotatably coupled to the first edge of the first substantially planar member and wherein the second edge further comprises a plurality of serrations disposed along at least a portion of the second edge;
   wherein the third substantially planar member comprises a first edge and an opposing second edge, wherein the first edge is rotatably coupled to the second edge of the first substantially planar member and wherein the second edge further comprises a second plurality of serrations disposed along at least a portion of the second edge of the third substantially planar member;
   wherein the plurality of serrations and the second plurality of serrations are configured to engage an inner surface of a cinder block to increase the friction between the respective second and third substantially planar members and the inner surface of the cinder block and to limit rotational movement of the respective second and third substantially planar members; and
   wherein at least one of the second substantially planar member and the third substantially planar member further comprises a tab member rotatably coupled to the at least one of the second substantially planar member and the third substantially planar member and rotatable from a first position wherein the tab member is aligned with the at least one of the second substantially planar member and the third substantially planar member and a second position wherein the tab member is disposed at an angle to the at least one of the second substantially planar member and the third substantially planar member.

2. The apparatus of claim 1, wherein the second substantially planar member is integrally formed with the first substantially planar member and the third substantially planar member is integrally formed with the first substantially planar member.

3. The apparatus of claim 1, wherein the first axis is substantially aligned with the first edge and the second axis is substantially aligned with the second edge.

4. The apparatus of claim 1, wherein the tab member is coupled to the second substantially planar member, wherein the apparatus further comprises a second tab member rotatably coupled to the third substantially planar member, wherein the second tab member rotates from a first position wherein the second tab member is aligned with the third substantially planar member and a second position wherein at least a portion of the second tab member is disposed at an orthogonal angle to the third substantially planar member.

5. The apparatus of claim 4, wherein the tab member is integrally formed from the second substantially planar member and the second tab member is integrally formed from the third substantially planar member.

6. The apparatus of claim 4, wherein each of the tab member and the second tab member comprise a fixed end rotatably coupled to the respective ones of the second substantially planar member and the third substantially planar member and a distal free end, and wherein each of the tab member and second tab member are elongated, substantially planar members.

7. The apparatus of claim 1, wherein the second substantially planar member further comprises a first tab aperture disposed along a surface of and providing a first passageway through the second substantially planar member, wherein the first tab aperture is disposed adjacent to the tab member;
   wherein the third substantially planar member further comprises a second tab aperture disposed along a surface of and providing a second passageway through the third substantially planar member, wherein the second tab aperture is disposed adjacent to the second tab member.

8. The apparatus of claim 1, wherein each of the second substantially planar member and third substantially planar member further comprise:
   a top edge disposed between the respective first and second edges; and
   a beveled edge extending from the respective top edge to the respective second edge of each of the second substantially planar member and third substantially planar members.

9. The apparatus of claim 1 further comprising a plurality of screw tabs, each screw tab disposed along at least one edge of the aperture through the first substantially planar member, wherein each screw tab comprising an aperture disposed through the respective screw tab.

10. The apparatus of claim 9, wherein the aperture through the first substantially planar member is a rectangular aperture and wherein at least one screw tab is disposed at each corner of the rectangular aperture.

11. The apparatus of claim 10, further comprising a fire strobe coupled to at least one of the screw tabs on the first substantially planar member.

12. The apparatus of claim 1, further comprising a mud ring and an electrical junction box coupled to the first substantially planar member, wherein at least one of the mud ring and the electrical junction box extend at least partially through the aperture in the first substantially planar member.

13. A method for installing an electrical box block bracket comprising:
 providing a construction block having an outer wall and at least one open cell;
 providing the electrical box block bracket comprising:
  a first substantially planar member comprising a front surface, an opposing rear surface, a first edge and an opposing second edge;
  an aperture disposed along the first substantially planar member and providing a passageway through the first substantially planar member;
  a second substantially planar member comprising a first edge rotatably coupled to the first substantially planar member and an opposing second edge, the second substantially planar member extending from the first edge of the first substantially planar member;
  a third substantially planar member comprising a first edge rotatably coupled to the first substantially planar member and an opposing second edge, the third substantially planar member extending from the second edge of the first substantially planar member;
  a tab member rotatably coupled to the second substantially planar member and rotatable from a first position wherein the tab member is aligned with the second substantially planar member and a second position wherein the tab member is disposed at an angle to the second substantially planar member;
  wherein the first edge is rotatably coupled to the first edge of the first substantially planar member and wherein the second edge further comprises a plurality of serrations disposed along at least a portion of the second edge;
  wherein the first edge is rotatably coupled to the second edge of the first substantially planar member and wherein the second edge further comprises a second plurality of serrations disposed along at least a portion of the second edge of the third substantially planar member; and
  wherein the plurality of serrations and the second plurality of serrations are configured to engage an inner surface of the construction block to increase the friction between the respective second and third substantially planar members and the inner surface of the construction block and to limit rotational movement of the respective second and third substantially planar members;
 disposing a mud ring comprising a bottom surface, adjacent a front surface of the first substantially planar member, wherein at least a portion of the mud ring extends through the aperture;
 rotating the second substantially planar member and the third substantially planar member towards each other and towards the rear surface of the first substantially planar member;
 placing at least a portion of the first, second, and third substantially planar members into the open cell of the construction block;
 positioning the bottom surface of the mud ring on at least a portion of the outer wall of the construction block;
 rotating the second substantially planar member in a direction away from the rear surface of the first substantially planar member until the second edge of the second substantially planar member contacts an inner wall of the open cell;
 rotating the third substantially planar member in a second direction away from the rear surface of the first substantially planar member until the second edge of the third substantially planar member contacts the inner wall of the open cell; and
 folding the tab member in a direction away from an outer surface of the second substantially planar member and about at least a portion of the outer wall of the construction block.

14. The method of claim 13, wherein the third substantially planar member further comprises a second tab member rotatably coupled to the third substantially planar member and rotatable from a first position wherein the second tab member is aligned with the third substantially planar member and a second position wherein the second tab member is disposed at an angle to the second substantially planar member, and wherein the method further comprises:
 folding the second tab member in a second direction away from an outer surface of the third substantially planar member and about at least a portion of one of the outer wall of the construction block and a rib of the construction block.

15. The method of claim 13, wherein wherein each of the second and third substantially planar members are rotated until the respective serrated portions contact the inner wall of the open cell of the construction block.

16. An apparatus comprising:
 a first substantially planar member comprising a first edge and an opposing second edge;
 an aperture disposed through the first substantially planar member, wherein the aperture comprises at least half of the surface area of the first substantially planar member;
 a second substantially planar member comprising:
  a first edge rotatably coupled to the first edge of the first substantially planar member; and
  an opposing second edge, wherein the second edge further comprises a plurality of serrations disposed along at least a portion of the second edge;
  the second substantially planar member extending from the first edge of the first substantially planar member, wherein the second substantially planar member is rotatable about a first axis;
 a first rear member coupled to the second edge of the second substantially planar member and extending at an angle from the second substantially planar member, wherein the first rear member comprises a first tab member rotatably coupled to the first rear member and rotatable from a first position wherein the first tab member is aligned with the second rear member and a second position wherein at least a portion of the first tab member is disposed at an angle orthogonal to the first rear member and a rear surface of the first substantially planar member;
 a third substantially planar member comprising:
  a first edge rotatably coupled to the second edge of the first substantially planar member; and
  an opposing second edge, wherein the second edge further comprises a second plurality of serrations disposed along at least a portion of the second edge of the third substantially planar member;

the third substantially planar member extending from the second edge of the first substantially planar member,
wherein the second substantially planar member is configured to rotate about a second axis;
wherein the plurality of serrations and the second plurality of serrations are configured to engage an inner surface of a cinder block to increase the friction between the respective second and third substantially planar members and the inner surface of the cinder block and to limit rotational movement of the respective second and third substantially planar members;
a second rear member coupled to the second edge of the third substantially planar member and extending at an angle from the third substantially planar member, wherein the second rear member comprises a second tab member rotatably coupled to the second rear member and rotatable from a first position wherein the second tab member is aligned with the second rear member and a second position wherein the second tab member is disposed at an angle orthogonal to the first rear member and a rear surface of the first substantially planar member.

17. The apparatus of claim 16, wherein the first axis of rotation is parallel to the second axis of rotation.

18. The apparatus of claim 16, wherein each of the second substantially planar member and third substantially planar member further comprise:
 a top edge disposed between the respective first and second edges; and
 a beveled edge extending from the respective top edge to the respective second edge of each of the second substantially planar member and third substantially planar members.

* * * * *